US008798656B2

(12) United States Patent
Wang et al.

(10) Patent No.: US 8,798,656 B2
(45) Date of Patent: Aug. 5, 2014

(54) METHODS AND APPARATUS BY WHICH PERIODICALLY BROADCASTING NODES CAN RESOLVE CONTENTION FOR ACCESS TO A SMALLER POOL OF BROADCASTING RESOURCES

(75) Inventors: Ying Wang, Easton, PA (US); Sundar Subramanian, Somerville, NJ (US); Xinzhou Wu, Monmouth Junction, NJ (US); Junyi Li, Chester, NJ (US); Thomas J. Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 13/448,174

(22) Filed: Apr. 16, 2012

(65) Prior Publication Data

US 2013/0273951 A1 Oct. 17, 2013

Related U.S. Application Data

(60) Provisional application No. 61/502,791, filed on Jun. 29, 2011.

(51) Int. Cl.
*H04W 72/02* (2009.01)

(52) U.S. Cl.
USPC ............ 455/509; 370/329; 370/341; 370/431

(58) Field of Classification Search
CPC .............................. H04W 84/08; H04W 28/04
USPC .......................................................... 455/509
See application file for complete search history.

(56) References Cited

U.S. PATENT DOCUMENTS

| 5,752,193 | A | 5/1998 | Scholefield et al. |
| 6,651,242 | B1 * | 11/2003 | Hebbagodi et al. ........... 717/127 |
| 7,039,672 | B2 * | 5/2006 | Wu et al. ....................... 709/201 |
| 7,249,381 | B2 * | 7/2007 | Telesco ............................ 726/27 |
| 7,366,892 | B2 * | 4/2008 | Spaur et al. .................... 713/151 |
| 7,469,421 | B2 * | 12/2008 | Telesco ............................ 726/27 |
| 7,565,701 | B2 * | 7/2009 | Telesco ............................ 726/27 |
| 7,599,326 | B2 * | 10/2009 | Watson .......................... 370/329 |
| 7,840,116 | B2 * | 11/2010 | Suzuki et al. .................. 386/291 |
| 7,864,722 | B2 * | 1/2011 | Yi et al. ......................... 370/312 |
| 7,945,936 | B2 * | 5/2011 | Yamagishi et al. ............. 725/97 |
| RE42,452 | E * | 6/2011 | Halton et al. ................. 370/329 |
| 7,961,698 | B2 * | 6/2011 | Wu et al. ....................... 370/344 |
| 8,060,103 | B2 * | 11/2011 | Sung ............................. 455/446 |
| 8,149,771 | B2 * | 4/2012 | Khivesara et al. ............ 370/329 |

(Continued)

FOREIGN PATENT DOCUMENTS

WO 2010087331 A1 8/2010

OTHER PUBLICATIONS

International Search Report and Written Opinion—PCT/US2012/044741—ISA/EPO—Oct. 10, 2012.

*Primary Examiner* — Hai V Nguyen
(74) *Attorney, Agent, or Firm* — James K. O'Hare

(57) ABSTRACT

A method, a computer program product, and an apparatus for wireless communication are provided. The apparatus transmits broadcast information in a first broadcast resource from a first set of broadcast resources. In addition, the apparatus determines based on the broadcast information a need for a second broadcast resource from a second set of broadcast resources. Furthermore, the apparatus selects the second broadcast resource based on a priority associated with the first broadcast resource.

48 Claims, 12 Drawing Sheets

(56) References Cited

U.S. PATENT DOCUMENTS

| | | | |
|---|---|---|---|
| 8,249,062 B1* | 8/2012 | Narasimhan et al. | 370/356 |
| RE43,669 E* | 9/2012 | Halton et al. | 370/329 |
| 8,295,220 B2* | 10/2012 | Zou et al. | 370/312 |
| 8,320,922 B2 | 11/2012 | Achour et al. | |
| 8,406,248 B2* | 3/2013 | Pratt et al. | 370/444 |
| 8,495,232 B2* | 7/2013 | Wu et al. | 709/230 |
| 8,503,414 B2* | 8/2013 | Ho et al. | 370/338 |
| 8,548,465 B2* | 10/2013 | Mueck et al. | 455/434 |
| 8,559,359 B2* | 10/2013 | Lott et al. | 370/318 |
| 8,559,362 B2* | 10/2013 | Vujcic et al. | 370/319 |
| 8,576,827 B2* | 11/2013 | Ho | 370/345 |
| 8,655,281 B2* | 2/2014 | Wu et al. | 455/63.1 |
| RE44,809 E* | 3/2014 | Halton et al. | 370/329 |
| 8,670,386 B2* | 3/2014 | Bai et al. | 370/328 |
| 8,695,050 B2* | 4/2014 | Yamagishi | 725/97 |
| 2002/0131447 A1* | 9/2002 | Krishnamurthy et al. | 370/465 |
| 2003/0206520 A1* | 11/2003 | Wu et al. | 370/230 |
| 2004/0240428 A1* | 12/2004 | Jiang | 370/351 |
| 2005/0037706 A1* | 2/2005 | Settle | 455/12.1 |
| 2005/0136938 A1* | 6/2005 | Kang | 455/452.2 |
| 2006/0120358 A1* | 6/2006 | Narasimhan et al. | 370/355 |
| 2006/0280434 A1* | 12/2006 | Suzuki et al. | 386/83 |
| 2007/0157209 A1* | 7/2007 | Hashimoto et al. | 718/104 |
| 2007/0180119 A1* | 8/2007 | Khivesara et al. | 709/226 |
| 2007/0211751 A1* | 9/2007 | Yoshikawa | 370/447 |
| 2007/0288526 A1* | 12/2007 | Mankad et al. | 707/200 |
| 2007/0294319 A1* | 12/2007 | Mankad et al. | 707/204 |
| 2008/0056295 A1 | 3/2008 | Loda et al. | |
| 2008/0113680 A1* | 5/2008 | Sung | 455/512 |
| 2008/0198847 A1* | 8/2008 | Yamagishi et al. | 370/390 |
| 2008/0198848 A1* | 8/2008 | Yamagishi | 370/390 |
| 2009/0003306 A1 | 1/2009 | Plutov et al. | |
| 2009/0010205 A1* | 1/2009 | Pratt et al. | 370/328 |
| 2009/0016229 A1* | 1/2009 | Wu et al. | 370/252 |
| 2009/0019173 A1* | 1/2009 | Wu et al. | 709/230 |
| 2009/0247177 A1 | 10/2009 | Stamoulis et al. | |
| 2009/0268684 A1* | 10/2009 | Lott et al. | 370/329 |
| 2009/0279563 A1* | 11/2009 | Sampath et al. | 370/432 |
| 2010/0002641 A1* | 1/2010 | Li et al. | 370/329 |
| 2010/0131635 A1* | 5/2010 | Gunduzhan et al. | 709/224 |
| 2010/0195645 A1* | 8/2010 | Bowes et al. | 370/389 |
| 2011/0069653 A1* | 3/2011 | Wang et al. | 370/312 |
| 2011/0090854 A1 | 4/2011 | Montojo et al. | |
| 2011/0093569 A1* | 4/2011 | Yamagishi | 709/219 |
| 2011/0228691 A1* | 9/2011 | Wu et al. | 370/252 |
| 2011/0280190 A1 | 11/2011 | Sakata et al. | |
| 2011/0314505 A1* | 12/2011 | Cho et al. | 725/62 |
| 2012/0040702 A1* | 2/2012 | Wu et al. | 455/501 |
| 2012/0226930 A1* | 9/2012 | Colban et al. | 713/340 |
| 2012/0230195 A1* | 9/2012 | Khivesara et al. | 370/235 |
| 2012/0294223 A1* | 11/2012 | Li et al. | 370/312 |
| 2013/0148566 A1* | 6/2013 | Doppler et al. | 370/312 |
| 2013/0156015 A1* | 6/2013 | Abe et al. | 370/336 |
| 2013/0273951 A1* | 10/2013 | Wang et al. | 455/509 |

* cited by examiner

METHODS AND APPARATUS BY WHICH PERIODICALLY BROADCASTING NODES CAN RESOLVE CONTENTION FOR ACCESS TO A SMALLER POOL OF BROADCASTING RESOURCES

CROSS-REFERENCE TO RELATED APPLICATION(S)

This application claims the benefit of U.S. Provisional Application Ser. No. 61/502,791, entitled "METHODS AND APPARATUS BY WHICH PERIODICALLY BROADCASTING NODES CAN RESOLVE CONTENTION FOR ACCESS TO A SMALLER POOL OF BROADCASTING RESOURCES" and filed on Jun. 29, 2011, which is expressly incorporated by reference herein in its entirety.

BACKGROUND

1. Field

The present disclosure relates generally to communication systems, and more particularly, to resolving contention for access to a smaller pool of broadcasting resources.

2. Background

In typical IEEE 802.11 systems, the duration of a broadcast is proportional to the size of the packet. In a synchronous and distributed system with a common frame-based structure, broadcast resources are allocated for transmitting broadcast information. If broadcast packets exceed the size of the broadcast resources, the broadcast information may be spread over two or more transmissions. Spreading the broadcast information over additional transmissions increases the latency of a broadcast. A method and an apparatus are needed for improving the efficiency of transmitting broadcast information.

SUMMARY

In an aspect of the disclosure, a method, a computer program product, and an apparatus are provided. The apparatus transmits broadcast information in a first broadcast resource from a first set of broadcast resources. In addition, the apparatus determines based on the broadcast information a need for a second broadcast resource from a second set of broadcast resources. Furthermore, the apparatus selects the second broadcast resource based on a priority associated with the first broadcast resource.

DETAILED DESCRIPTION

Figure 1:
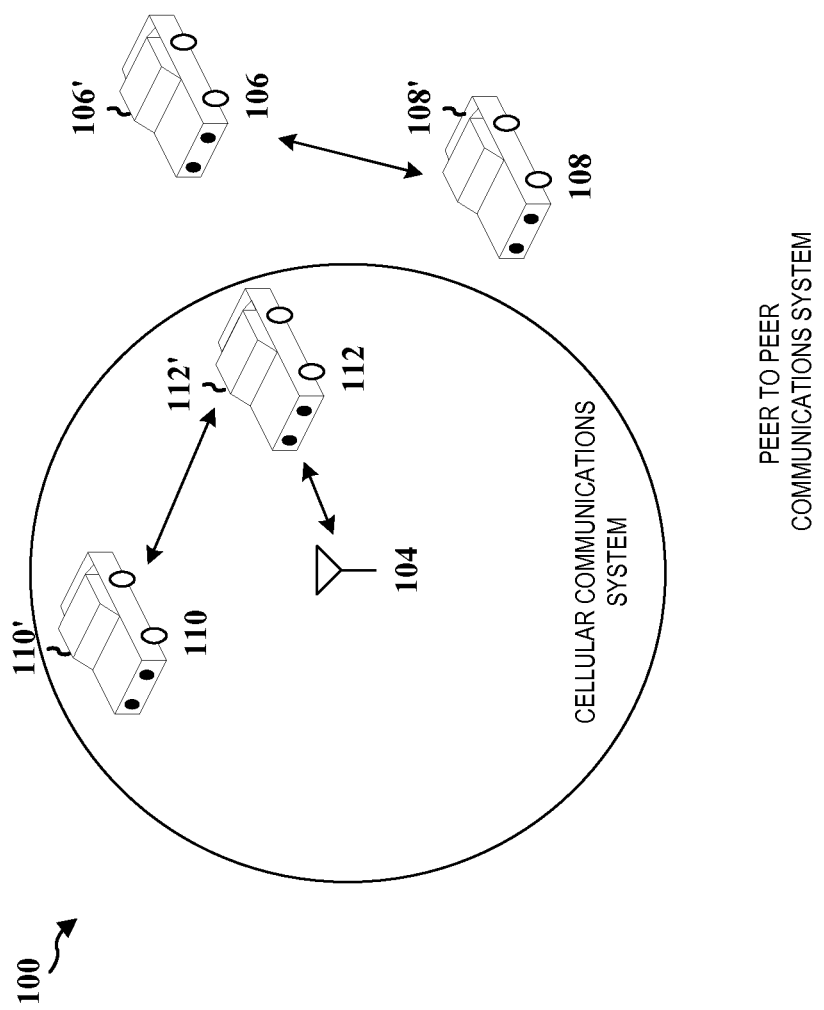
FIG. 1 is a diagram illustrating a wireless peer-to-peer communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a drawing of an exemplary peer-to-peer communications system 100. The peer-to-peer communications system 100 includes vehicles 106', 108', 110', 112' equipped with wireless devices 106, 108, 110, 112, respectively. The peer-to-peer (or vehicle-to-vehicle) communications system 100 may overlap with a cellular communications system, such as for example, a wireless wide area network (WWAN). Some of the wireless devices 106, 108, 110, 112 may communicate together in peer-to-peer communication, some may communicate with the base station 104, and some may do both. For example, as shown in FIG. 1, the wireless devices 106, 108 are in peer-to-peer communication and the wireless devices 110, 112 are in peer-to-peer communication. The wireless device 112 is also communicating with the base station 104.

A wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, VLinQ, WiMedia, Bluetooth, ZigBee, or Wi-Fi based on the IEEE 802.11 standard. To simplify the discussion, the exemplary methods and apparatus may be discussed within the context of VLinQ. However, one of ordinary skill in the art would understand that the exemplary methods and apparatuses are applicable more generally to a variety of other wireless peer-to-peer communication systems.

Figure 2:
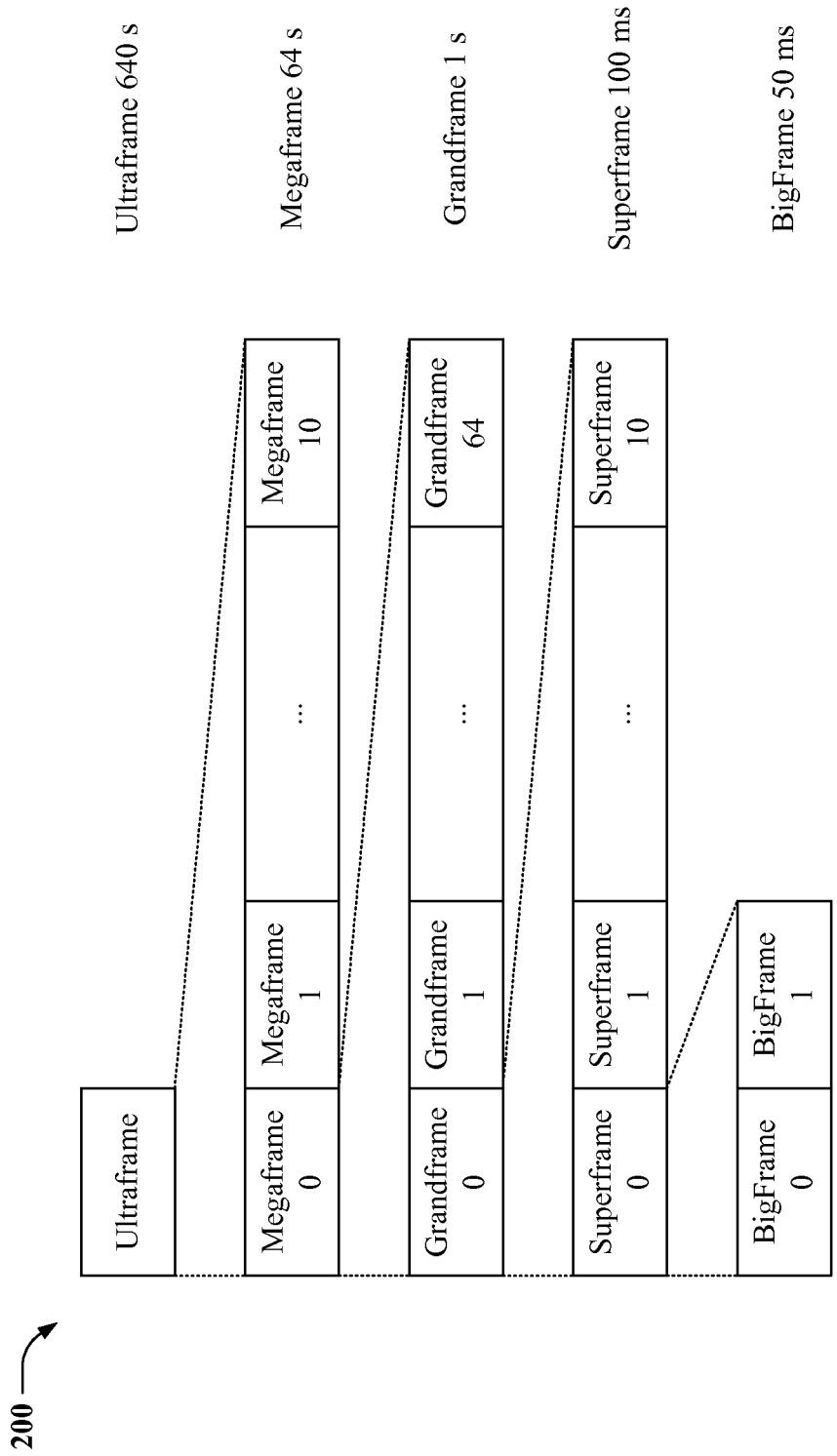
FIG. 2 is a diagram illustrating an exemplary time structure for peer-to-peer communication between the wireless devices.

FIG. 2 is a diagram 200 illustrating an exemplary time structure for peer-to-peer communication between the wireless devices. An ultraframe is 640 seconds and includes ten megaframes. Each megaframe is 64 seconds and includes 64 grandframes. Each grandframe is one second and includes ten superframes. Each superframe is 100 ms and includes two bigframes. Each bigframe is 50 ms. A bigframe may also be referred to as a frame.

Figure 3:
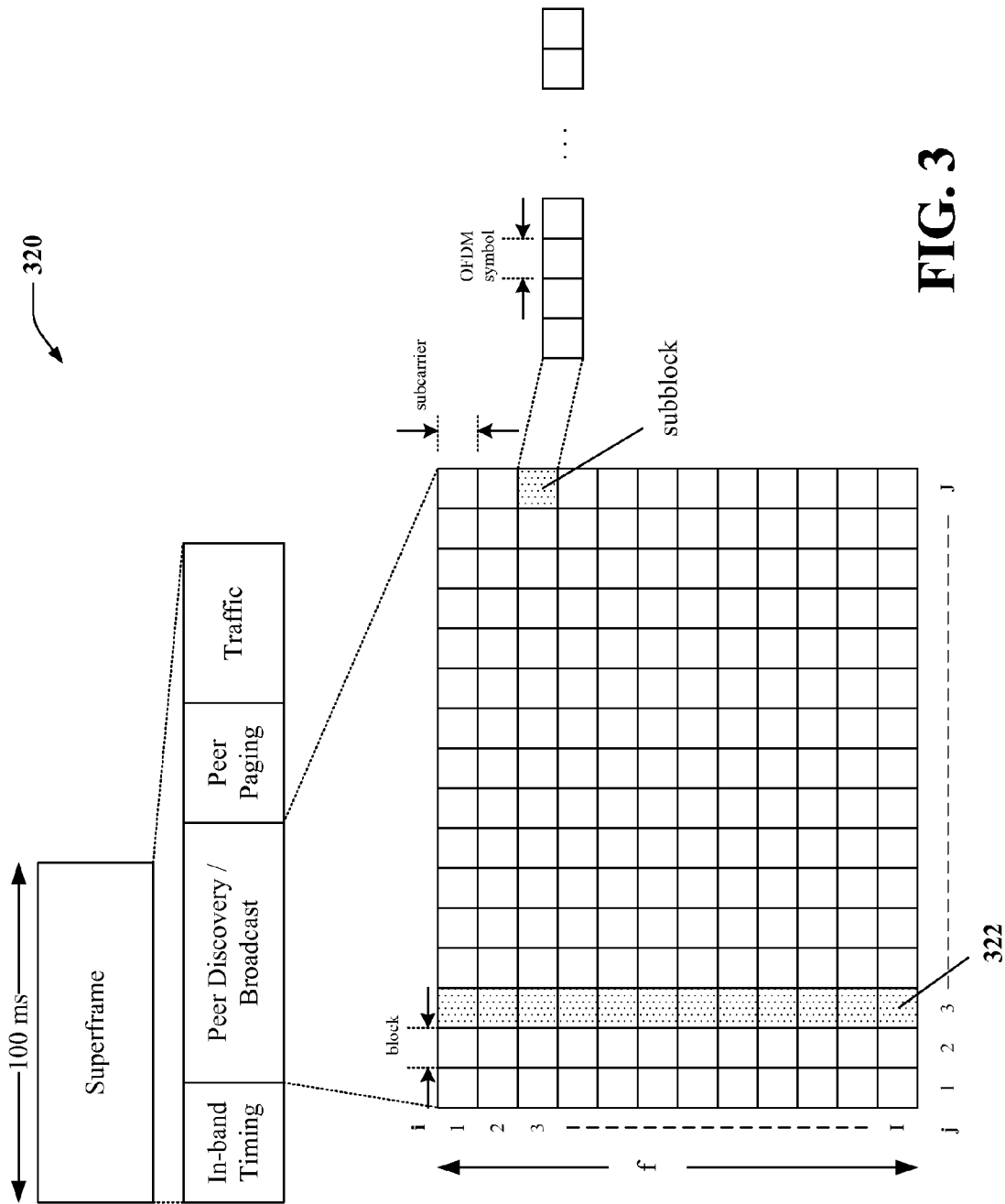
FIG. 3 is a diagram illustrating an operation timeline of a superframe and a structure of a peer discovery/broadcast channel.

FIG. 3 is a diagram 320 illustrating an operation timeline of a superframe and an exemplary structure of a peer discovery/broadcast channel. The superframe includes an in-band timing channel, a peer discovery/broadcast channel, a peer paging channel, and a data traffic channel (TCCH). The peer discovery/broadcast channel may include J blocks (e.g., 75) for communicating broadcast/peer discovery information. Each block may include I subblocks (e.g., 112). Each subblock may include a plurality of orthogonal frequency-division multiplexing (OFDM) symbols (e.g., 22) at the same subcarrier. Different blocks may correspond to different peer discovery resource identifiers (PDRIDs). For example, a first PDRID may correspond to the block at j=1, a second PDRID may correspond to the block at j=2, etc.

Upon power up, a wireless device listens to the peer discovery/broadcast channel for a period of time and selects a PDRID based on a determined energy on each of the PDRIDs. For example, a wireless device may select a PDRID corresponding to the block 322 at j=3. The particular PDRID may map to other blocks in other superframes due to hopping. In the block associated with the selected PDRID, the wireless device transmits its peer discovery/broadcast signal. In blocks unassociated with the selected PDRID, the wireless device listens for peer discovery/broadcast signals transmitted by other wireless devices.

The wireless device may also reselect a PDRID if the wireless device detects a PDRID collision. That is, a wireless device may listen rather than transmit on its available broadcast (peer discovery) resource in order to detect an energy on the broadcast resource corresponding to its PDRID. The wireless device may also detect energies on other broadcast resources corresponding to other PDRIDs. The wireless device may reselect a PDRID based on the determined energy on the broadcast resource corresponding to its PDRID and the detected energies on the other broadcast resources corresponding to other PDRIDs.

When a broadcast packet exceeds the size of the allocated broadcast resource, a wireless device may spread the broadcast information in the broadcast packet over multiple allocated broadcast resources. Spreading the broadcast information over multiple transmissions increases the latency of the broadcast. Alternatively, additional/extended broadcast resources may be allocated for the occasional broadcast packets that exceed the typical length. However, when multiple wireless devices request access to the extended broadcast resources, the multiple wireless devices may end up using the same extended broadcast resource, leading to a broadcast packet collision.

Figure 4:
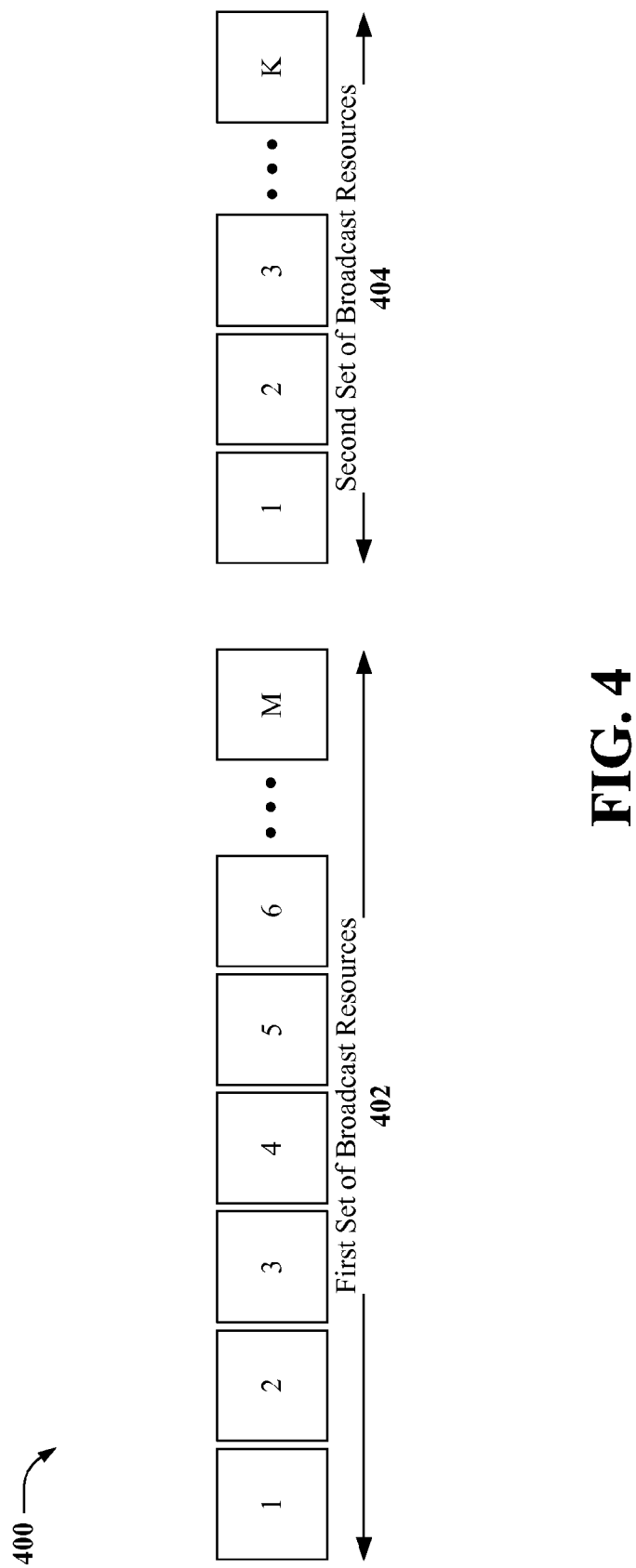
FIG. 4 is a diagram for illustrating an exemplary method for utilizing a first set of broadcast resources and a second set of broadcast resources.

FIG. 4 is a diagram 400 for illustrating an exemplary method for utilizing a first set of typical broadcast resources 402 and a second set of extended broadcast resources 404. The first set of broadcast resources 402 are typical broadcast resources in which wireless devices (i.e., broadcast nodes) may periodically send broadcast packets in a sequential manner. The first set of broadcast resources 402 is a predefined resource reserved for typical broadcasts. The second set of broadcast resources 404 is a predefined resource reserved for extended broadcasts. The second set of broadcast resources 404 provide extended broadcast resources for the occasional broadcast packets that are larger, more important, or have shorter latency requirements than the typical broadcast packets. Wireless devices may use the exemplary method to resolve implicitly the contention for the second set of broadcast resources 404.

As shown in FIG. 4, there are M resources in the first set of broadcast resources 402 and K resources in the second set of broadcast resources 404. The value K may be adjusted to be proportional to an expected number of larger broadcast packets. The value M may be adjusted based on the value K such that M=J−K. The number K of broadcast resources in the second set of broadcast resources 404 leads to a contention among the wireless devices for an extended resource (i.e., one in K resources) when more than one wireless device requires the use of the extended broadcast resources. According to an exemplary method, each wireless device is allocated or otherwise selects one of the M broadcast resources in the first set of broadcast resources 402 for transmitting broadcast information. Based on its broadcast information (e.g., size, latency requirement, priority), each wireless device may determine whether it needs to utilize the second set of broadcast resources 404. If a wireless device determines to utilize the second set of broadcast resources 404, the wireless device selects an extended broadcast resource in the second set of broadcast resources 404 based on a priority associated with its allocated or selected broadcast resource in the first set of broadcast resources 402.

An example best demonstrates the method. Assume that the wireless device is allocated the $4^{th}$ typical broadcast resource in the M broadcast resources of the first set of broadcast resources 402 within a particular superframe. In other superframes, the wireless device may be allocated a different typical broadcast resource in the M broadcast resources, as the allocated typical broadcast resource may hop around in each superframe. Assume also that the priority of the wireless devices is derived from the order in which the wireless devices transmit in the first set of broadcast resources 402. Accordingly, the priority of the wireless device is $4^{th}$ in the particular superframe, as the wireless device will yield the second set of broadcast resources 404 to the wireless devices allocated to the $1^{st}$, $2^{nd}$, and $3^{rd}$ typical broadcast resources. If the wireless device determines to utilize the second set of broadcast resources 404 and there are available extended broadcast resources, the wireless device may select one of the K extended broadcast resources and indicate the selected extended broadcast resource within the broadcast information transmitted in the $4^{th}$ typical broadcast resource.

The selected extended broadcast resource may be the earliest (e.g., lowest numbered, earliest in a known list or permutation, highest priority, earliest in time) "available" resource or next available extended broadcast resource. For example, assume K≥3 and that the wireless device receives a broadcast signal from a first wireless device in the $1^{st}$ typical broadcast resource indicating that the extended broadcast resource will not be utilized, receives a broadcast signal from a second wireless device in the $2^{nd}$ typical broadcast resource indicating that the $1^{st}$ extended broadcast resource will be utilized, and receives a broadcast signal from a third wireless device in the $3^{rd}$ typical broadcast resource indicating that the $2^{nd}$ extended broadcast resource will be utilized. The wireless device may then select the $3^{rd}$ extended broadcast resource, which is the next available extended broadcast resource. For another example, assume K≥3 and that the wireless device receives a broadcast signal from a first wireless device in the $1^{st}$ typical broadcast resource indicating that the extended broadcast resource will not be utilized, does not receive a broadcast signal transmitted by a second wireless device in the $2^{nd}$ typical broadcast resource indicating that the $1^{st}$ extended broadcast resource will be utilized (e.g., due to the distance between the wireless device and the second wireless device, interfering structures between the wireless device and the second wireless device, or other reasons that would prevent a broadcast signal transmitted by the second wireless device from being successfully decoded by the wireless device), and receives a broadcast signal from a third wireless device in the $3^{rd}$ typical broadcast resource indicating that the $2^{nd}$ extended broadcast resource will be utilized. The wireless device may then select the $1^{st}$ extended broadcast resource, which is the lowest numbered "available" resource. Although the second wireless device will utilize the $1^{st}$ extended broadcast resource, the wireless device determines the $1^{st}$ extended broadcast resource to be available because the wireless device did not receive the broadcast signal transmitted by the second wireless device indicating that the $1^{st}$ extended broadcast resource will be utilized.

Figure 5:
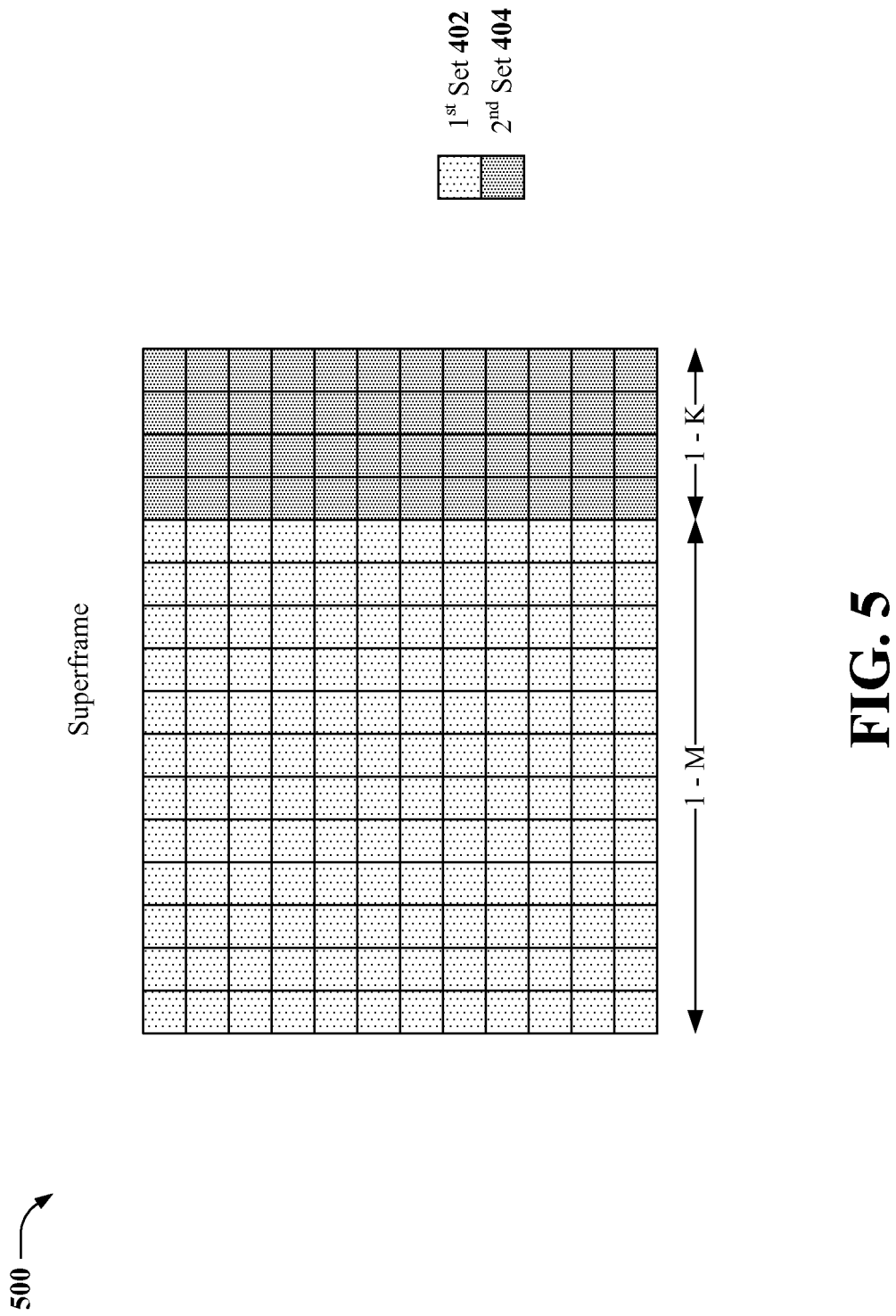
FIG. 5 is a diagram for illustrating the first set of broadcast resources and the second set of broadcast resources within the context of the broadcast resources illustrated in FIG. 3.

FIG. 5 is a diagram for illustrating the first set of broadcast resources 402 and the second set of broadcast resources 404 within the context of the broadcast resources illustrated in FIG. 3. The first set of broadcast resources 402 may be a set of typical broadcast resources that extend over M blocks of a particular superframe. The second set of broadcast resources 404 may be an additional set of extended broadcast resources that occur after the first set of broadcast resources 402 and extend over K blocks of a particular superframe. In alternative configurations, a subset of the extended broadcast resources may be from the data traffic channel. In such a configuration, the subset of the extended broadcast resources may also be used for unicast transmissions.

Figure 6:
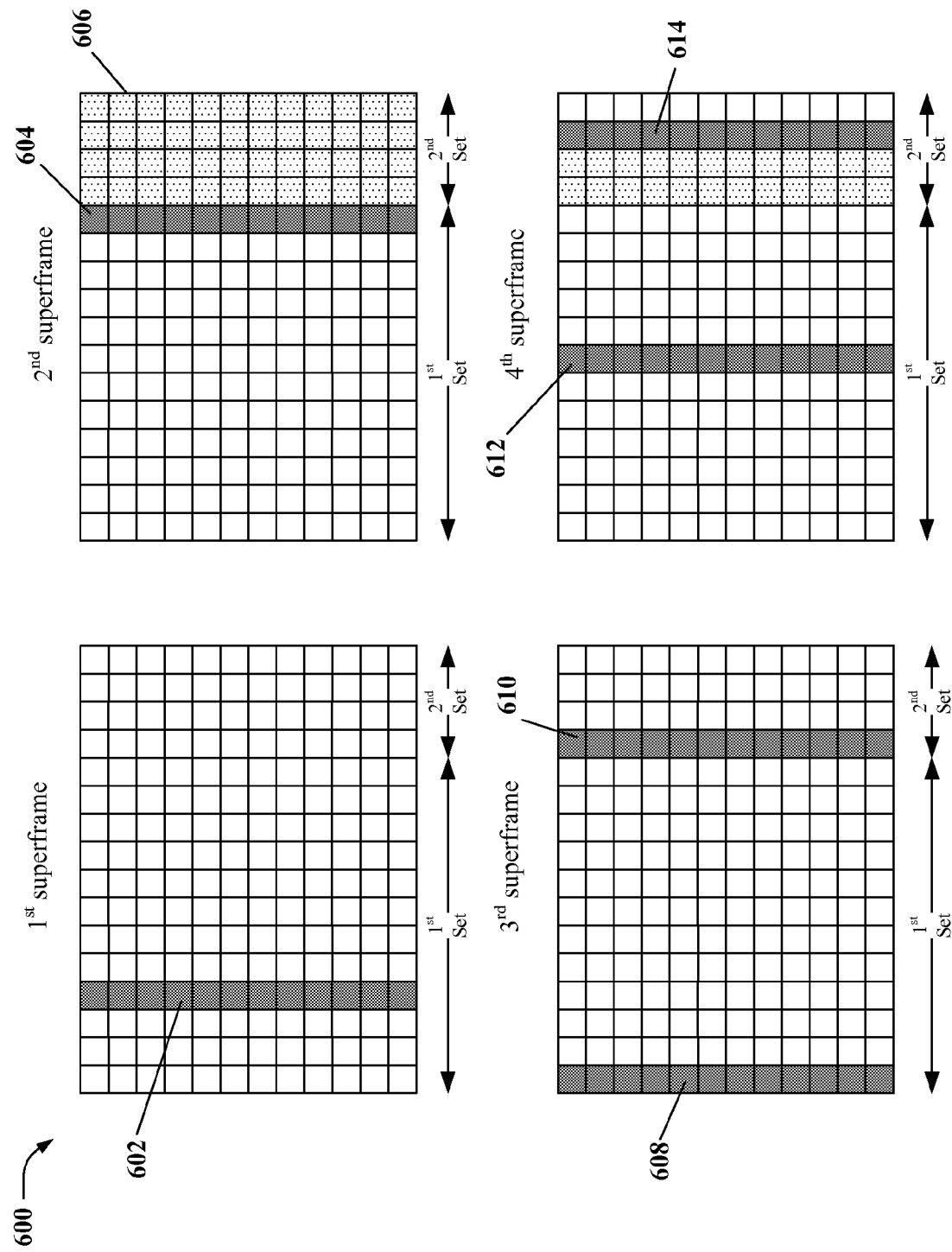
FIG. 6 is a diagram illustrating use of the first set of broadcast resources and the second set of broadcast resources by a wireless device.

FIG. 6 is a diagram illustrating use of the first set of broadcast resources 402 and the second set of broadcast resources 404 by a wireless device. In a first superframe, the wireless device is allocated typical broadcast resource 602. The wireless device determines not to utilize the extended broadcast resources. In a second superframe, the wireless device is allocated typical broadcast resource 604. The wireless device determines that it would like to utilize the extended broadcast resources 606, but because the extended broadcast resources 606 are fully utilized (by four of the wireless devices with a higher priority), the wireless device does not utilize the extended broadcast resources 606. In a third superframe, the wireless device is allocated typical broadcast resource 608. The wireless device determines to utilize the extended broadcast resources and, with the highest priority, selects the first available extended broadcast resources 610. In a fourth superframe, the wireless device is allocated typical broadcast resource 612. The wireless device determines to utilize the extended broadcast resources and selects the extended broadcast resources 614.

Figure 7:
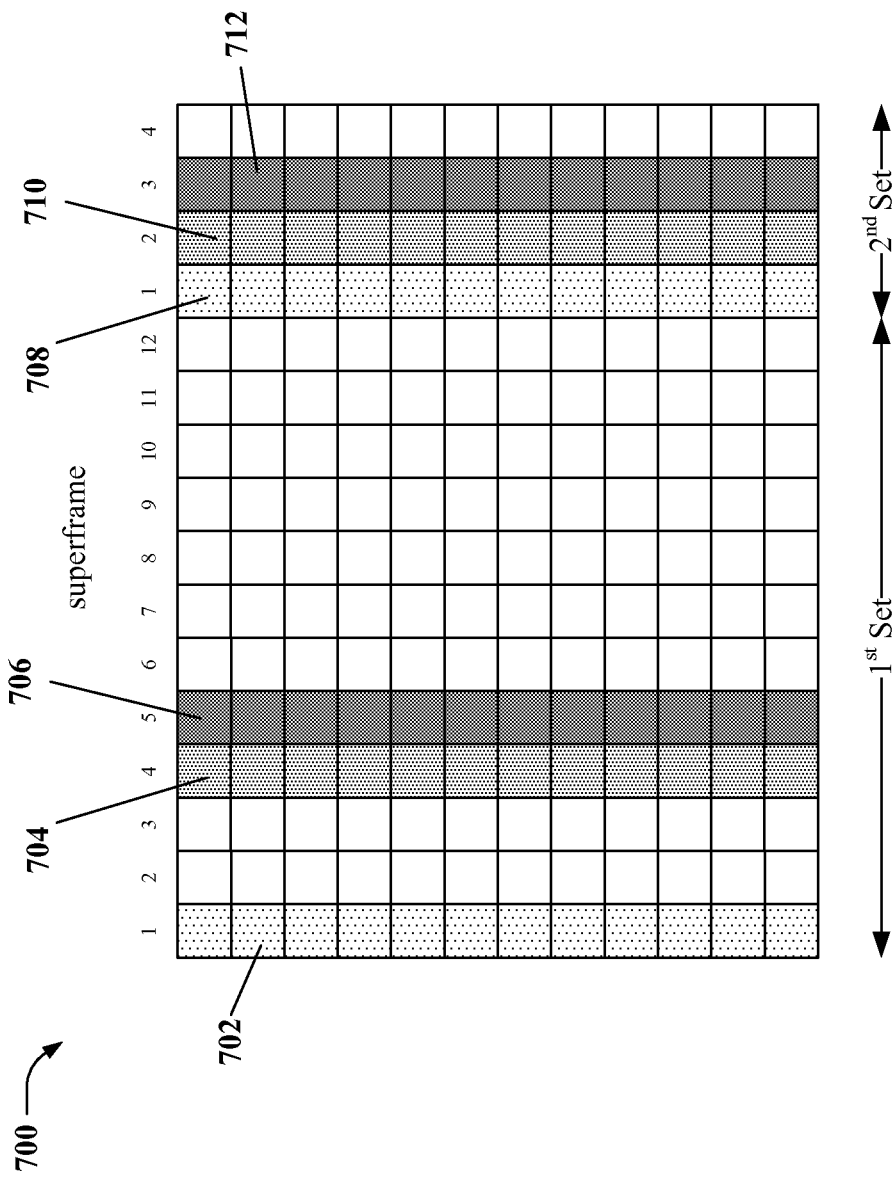
FIG. 7 is a diagram for illustrating an exemplary method.

FIG. 7 is a diagram 700 for illustrating an exemplary method. Assume a particular wireless device is allocated the $5^{th}$ block 706 of the first set of broadcast resources. The $5^{th}$ block 706 has a lower priority than the $1^{st}$-$4^{th}$ blocks of the first set of broadcast resources and a higher priority than the $6^{th}$-$12^{th}$ blocks of the first set of broadcast resources. Accordingly, wireless devices allocated to the $1^{st}$-$4^{th}$ blocks of the first set of broadcast resources will have first access to claim use of the second set of broadcast resources. The wireless device receives a broadcast signal in the $1^{st}$ block 702 of the first set of broadcast resources. The broadcast signal includes information indicating that the $1^{st}$ block 708 of the second set of broadcast resources will be utilized. The wireless device receives a broadcast signal in the $4^{th}$ block 704 of the first set of broadcast resources. The broadcast signal includes information indicating that the $2^{nd}$ block 710 of the second set of broadcast resources will be utilized. The wireless device determines that it may utilize the $3^{rd}$ block 712 of the second set of broadcast resources. The wireless device generates broadcast information. Based on the broadcast information, the wireless device determines whether the wireless device needs the $3^{rd}$ block 712 of the second set of broadcast resources.

The wireless device may determine whether to utilize the $3^{rd}$ block 712 based on a latency requirement, a priority, a size, and/or other factors of the generated broadcast information. For example, the wireless device may be able to transmit a broadcast signal every 100 ms (a period of the superframe) in an allocated block within the first set of broadcast resources. However, the generated broadcast information may be too stale (i.e., too old) after 100 ms. For another example, the generated broadcast information may be too large to be transmitted in one of the allocated blocks within the first set of broadcast resources. As such, the wireless device may determine to distribute the transmission of the generated broadcast information over multiple allocated blocks (e.g., n blocks) within the first set of broadcast resources. However, the wireless device may determine that distribution of the transmission of the generated broadcast information over the multiple n allocated blocks would result in the generated broadcast information being too stale after n*100 ms. For another example, the generated broadcast information may have a high priority and therefore may need to be transmitted as soon as possible, preferably earlier than 100 ms.

Assuming the wireless device determines to utilize the $3^{rd}$ block 712, the wireless device transmits broadcast information in the $5^{th}$ block 706. The broadcast information indicates that the $3^{rd}$ block 712 will be utilized. The broadcast information may further include peer discovery related information. Subsequently, the wireless device transmits additional broadcast/peer discovery information in the $3^{rd}$ block 712.

The order in which blocks are claimed in the second set of broadcast resources may be sequential, as described supra, or may be based on a permutation that is known to all the wireless devices. For example, the blocks may be claimed sequentially in the order of 1, 2, 3, 4. For another example, the blocks may be claimed non-sequentially, such as in the order of 2, 4, 3, 1.

Figure 8:
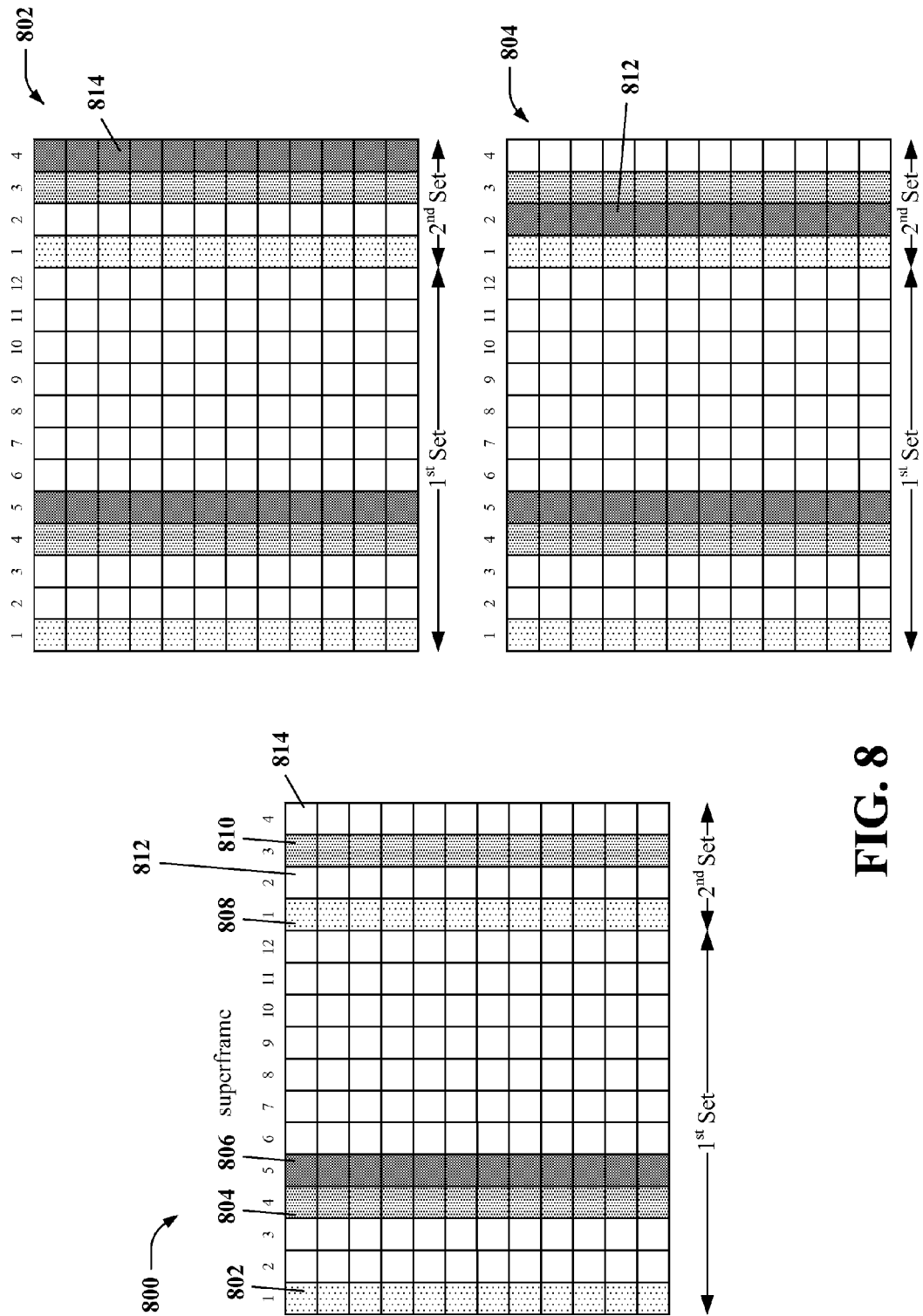
FIG. 8 is a diagram for illustrating another exemplary method.

FIG. 8 is a diagram 800 for illustrating another exemplary method. Assume a particular wireless device is allocated the $5^{th}$ block 806 of the first set of broadcast resources. The wireless device receives a broadcast signal in the $1^{st}$ block 802 of the first set of broadcast resources. The broadcast signal includes information indicating that the $1^{st}$ block 808 of the second set of broadcast resources will be utilized. The wireless device receives a broadcast signal in the $4^{th}$ block 804 of the first set of broadcast resources. The broadcast signal includes information indicating that the $3^{rd}$ block 810 of the second set of broadcast resources will be utilized. Because the $3^{rd}$ block 810 is being utilized, the wireless device will determine that another wireless device must have claimed use of the $2^{nd}$ block 812 of the second set of broadcast resources, as otherwise the wireless device allocated to the $4^{th}$ block 804 would have claimed the $2^{nd}$ block 812 instead of the $3^{rd}$ block 810. If the wireless device would like to use the second set of broadcast resources, the wireless device may determine whether to use the $2^{nd}$ block 812 or the $4^{th}$ block 814.

In one configuration, the wireless device may always select an earliest (e.g., lowest numbered, earliest in a known list or permutation, highest priority, earliest in time) "available" block for which the wireless device did not receive a broadcast signal indicating use of the block, such as the $2^{nd}$ block 812. In another configuration, the wireless device may always select a next available block, such as the $4^{th}$ block 814. In yet another configuration, the wireless device may determine whether to select the $2^{nd}$ block 812 or the $4^{th}$ block 814 based on a number of blocks available within the second set of broadcast resources and its own priority associated with the allocated $5^{th}$ block 806. For example, if the wireless device has a relatively high priority and the second set of broadcast resources are almost fully utilized by the time the wireless device must transmit in its allocated block within the first set of broadcast resources, the wireless device may select the $2^{nd}$ block 812. However, if the wireless device has a relative low priority or, if the wireless device has a relatively high priority and many blocks of the second set of broadcast resources remain to be claimed, the wireless device may select the $4^{th}$ block 814. Essentially, the wireless device may determine whether to select a block that is being utilized by another wireless device from which the wireless device did not receive broadcast information (e.g., due to distance, interfering structures, or other reasons that would prevent a broadcast signal from being successfully decoded) or to select a block that is unutilized based on a determination of whether the second set of broadcast resources will be fully utilized within the superframe.

Figure 9:
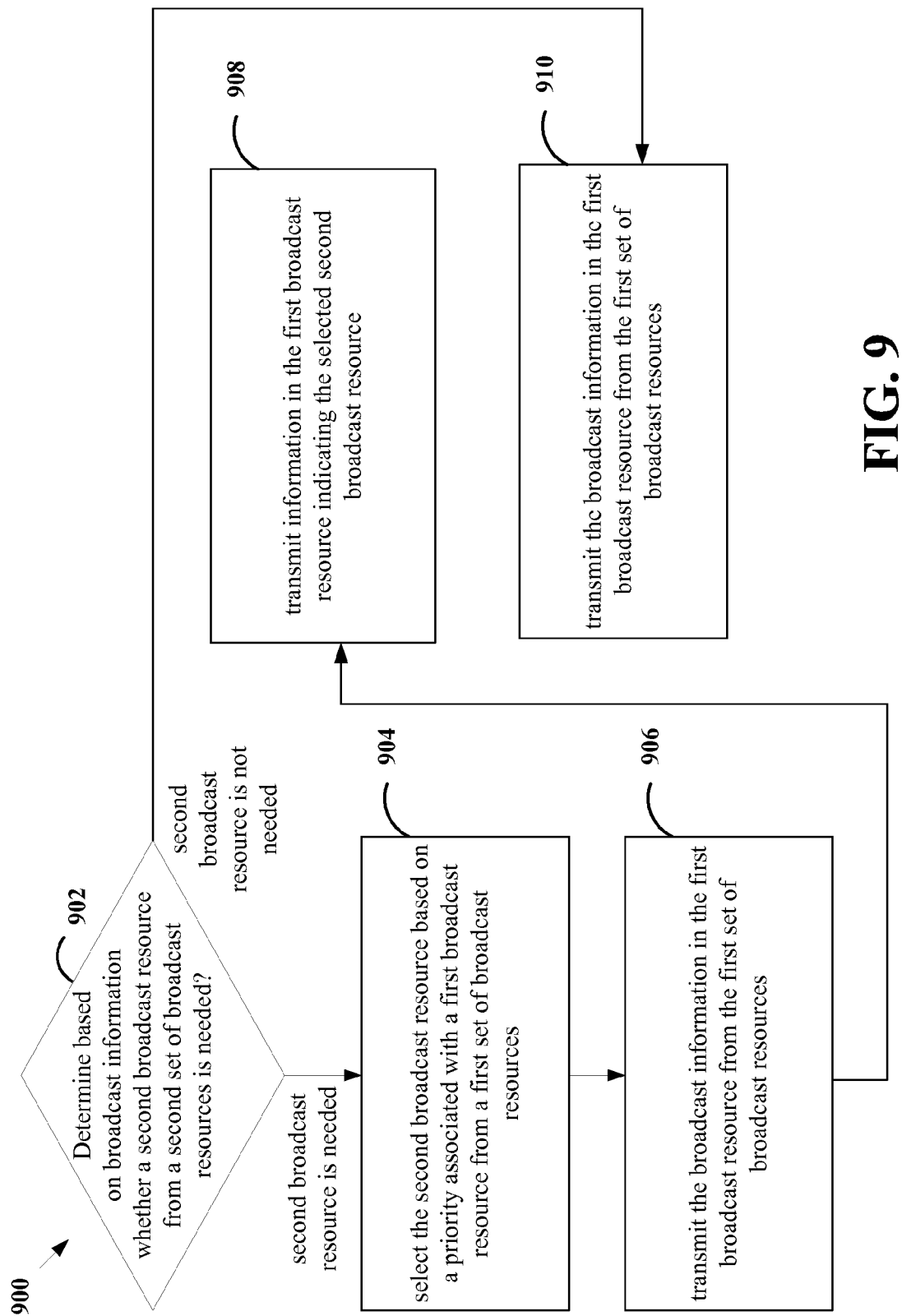
FIG. 9 is a flow chart of a method of wireless communication.

FIG. 9 is a flow chart 900 of an exemplary method. The method may be performed by a wireless device. As shown in FIG. 9, in step 902, the wireless device determines based on broadcast information whether a second broadcast resource from a second set of broadcast resources is needed. If a second broadcast resource is not needed, in step 910, the wireless device transmits the broadcast information in a first broadcast resource from a first set of broadcast resources. If a second broadcast resource is needed, in step 904, the wireless device selects the second broadcast resource based on a priority associated with the first broadcast resource. In steps 906/908, the wireless device transmits the broadcast information and indicates within the broadcast information the selected second broadcast resource.

For example, referring to FIG. 7, a wireless device assigned to the $5^{th}$ block 706 (a first broadcast resource), determines based on generated broadcast information a need for a second broadcast resource in the second set of broadcast resources. The wireless device selects the $3^{rd}$ block 712 as its second broadcast resource based on a priority associated with the first broadcast resource. That is, the $5^{th}$ block 706 has $5^{th}$ priority, and therefore the wireless device has $5^{th}$ priority to claim a block within the second set of broadcast resources. Accordingly, assuming all blocks are allocated, the wireless device is the $5^{th}$ to select a block within the second set of broadcast resources. The wireless device transmits broadcast information in the $5^{th}$ block 706. The broadcast information may indicate that the $3^{rd}$ block 712 was selected in the second set of broadcast resources.

The wireless device generates broadcast information. The generated broadcast information may include a first information subset and a second information subset. The wireless device may transmit the first information subset in the $5^{th}$ block 706. In one configuration, the wireless device may determine that the second information subset should be transmitted in broadcast resources that occur earlier than a next allocated broadcast resource in the first set of broadcast resources. As such, upon determining that the second information subset should be transmitted quickly, the wireless device may determine to use the second set of broadcast resources, select the $3^{rd}$ block 712, and transmit the second information subset in the $3^{rd}$ block 712. In another configuration, the wireless device may determine that the second information subset is too large to be transmitted with the first information subset in the first broadcast resource, or is too large to be transmitted in subsequent allocated broadcast resources within the first set of broadcast resources to meet latency requirements of the second information subset. As such, upon determining that the second information subset should be transmitted in additional broadcast resources, the wireless device may determine to use the second set of broadcast resources, select the $3^{rd}$ block 712, and transmit the second information subset in the $3^{rd}$ block 712.

Figure 10:
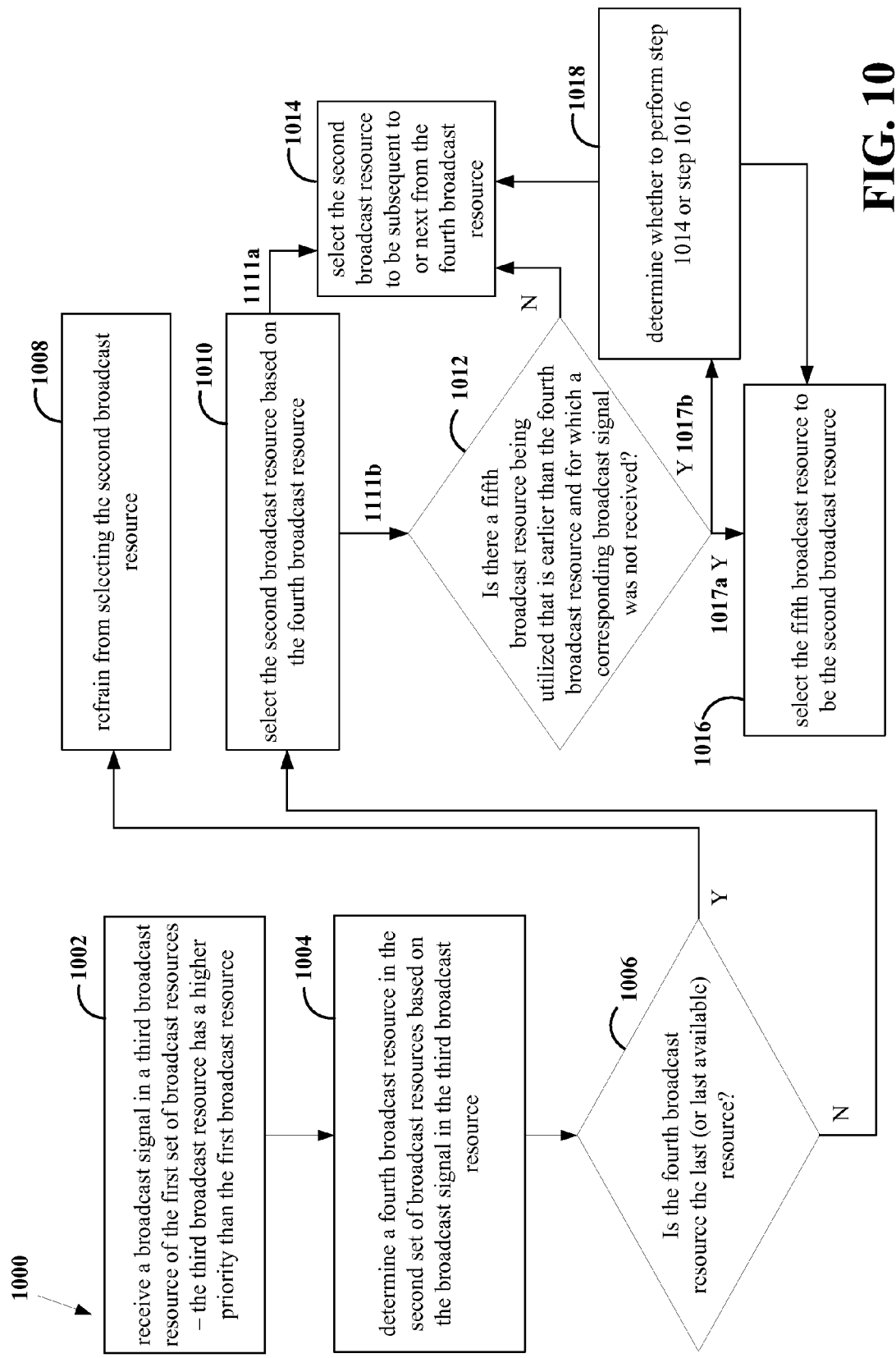
FIG. 10 is a flow chart of another method of wireless communication.

FIG. 10 is a flow chart 1000 of an exemplary method. The method may be performed by a wireless device. As shown in FIG. 10, in step 1002, the wireless device may receive a broadcast signal in a third broadcast resource of the first set of broadcast resources. The third broadcast resource has a higher priority than the first broadcast resource. In step 1004, the wireless device determines a fourth broadcast resource in the second set of broadcast resources based on the broadcast signal in the third broadcast resource. For example, referring to FIG. 8, assume the first broadcast resource is the $5^{th}$ block 806 and that the wireless device would like to utilize a second broadcast resource within the second set of broadcast resources. The wireless device may receive a broadcast signal in a third broadcast resource, such as the $4^{th}$ block 804. The $4^{th}$ block 804 has a higher priority than the $5^{th}$ block 806. The wireless device may determine a fourth broadcast resource of the second set of broadcast resources, such as the $3^{rd}$ block 810, based on the broadcast signal received in the $4^{th}$ block 804, as the broadcast signal received in the $4^{th}$ block 804 may indicated planned use of the $3^{rd}$ block 810.

In step 1006, the wireless device determines whether the fourth broadcast resource is the last (or last available) broadcast resource. If the fourth broadcast resource is the last (or last available) broadcast resource, in step 1008, the wireless device refrains from selecting a second broadcast resource. If the fourth broadcast resource is not the last (or last available) broadcast resource, in step 1010, the wireless device selects the second broadcast resource based on the fourth broadcast resource. For example, referring to FIG. 8, the $3^{rd}$ block 810 is not the last or last available broadcast resource, and therefore the wireless device may select its second broadcast resource to be the $2^{nd}$ block 812 or the $4^{th}$ block 814.

In one configuration, the wireless device moves from step 1010 to step 1014 through path 1111a, and selects its second broadcast resource to be subsequent to or next from (e.g., from a known list or permutation) the fourth broadcast resource. For example, the wireless device may select its second broadcast resource to be the $4^{th}$ block 814, which is subsequent to the $3^{rd}$ block 810. In another configuration, the wireless device moves from step 1010 to step 1012 through path 1111b, and determines whether there is a fifth broadcast resource that is utilized earlier (or has higher priority, lower numbered, earlier in a permutation list, etc.) than the fourth broadcast resource for which a corresponding broadcast signal was not received. For example, the wireless device may determine a fifth broadcast resource, $2^{nd}$ block 812, as being utilized even though the wireless device did not receive a corresponding broadcast signal indicating the $2^{nd}$ block 812 would be utilized.

If the wireless device determines that there is no earlier utilized broadcast resource for which a corresponding broadcast signal was not received, then the wireless device performs step 1014. If the wireless device determines that there is an earlier utilized broadcast resource (a fifth broadcast resource) for which a corresponding broadcast signal was not received, in step 1016 through path 1017a, the wireless device may select its second broadcast resource to be the fifth broadcast resource. In another configuration, in step 1018 through path 1017b, if there is a fifth broadcast resource that is utilized earlier than the fourth broadcast resource for which a corresponding broadcast signal was not received, the wireless device makes a determination whether to select its second broadcast resource as the fifth broadcast resource or to select its second broadcast resource as the broadcast resource subsequent to or next from the fourth broadcast resource. As discussed supra, the wireless device may make the determination in step 1018 based on a determination of whether the second set of broadcast resources will be fully utilized within the superframe.

Figure 11:
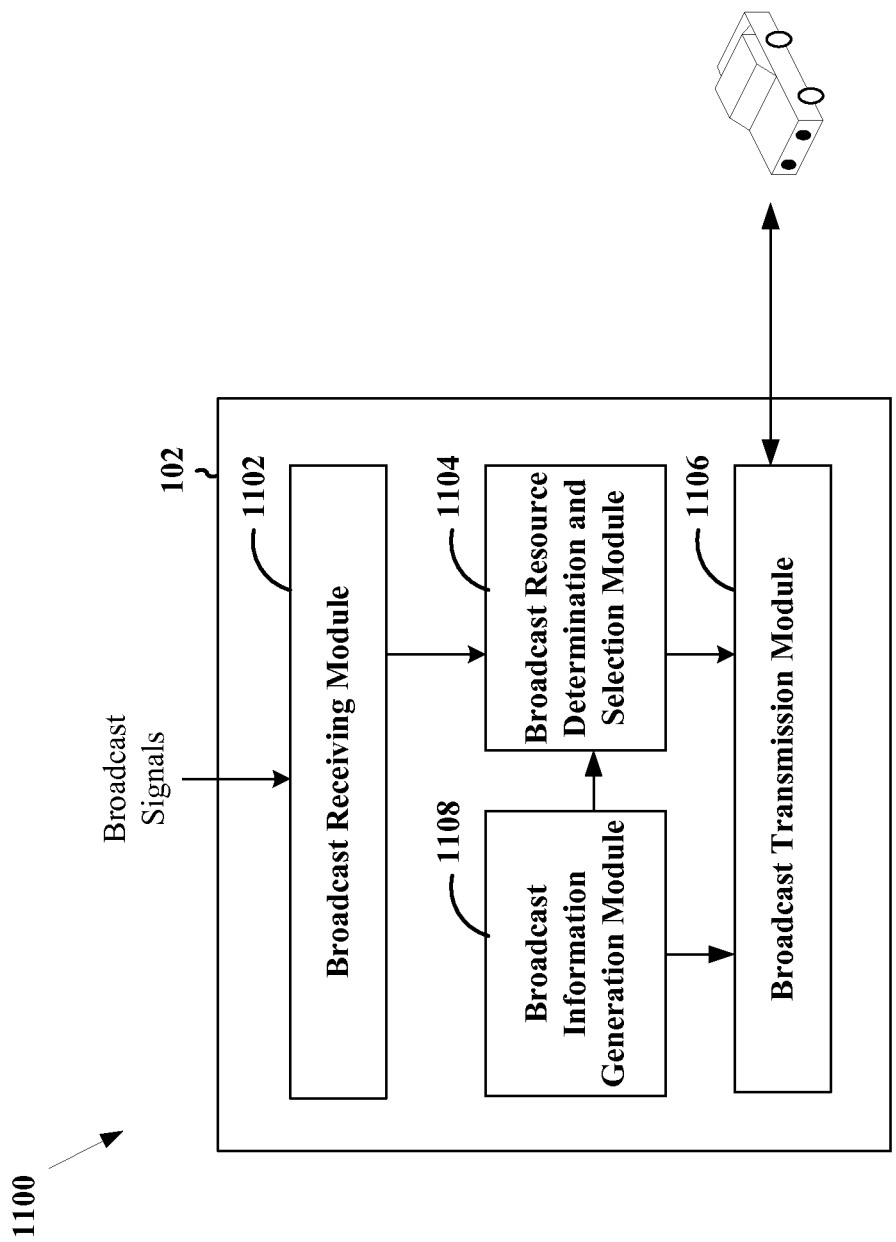
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 102. The apparatus 102 includes a broadcast receiving module 1102, a broadcast resource determination and selection module 1104, a broadcast transmission module 1106, and a broadcast information generation module 1108. The broadcast receiving module 1102 may be configured to receive broadcast information from other wireless devices. The broadcast information generation module 1108 may be configured to generate broadcast information. The generated broadcast information may be provided to the broadcast transmission module 1106, which may be configured to transmit a first information subset of the generated broadcast information in a first broadcast resource from a first set of broadcast resources. The generated broadcast information may also be provided to the broadcast resource determination and selection module 1104, which may be configured to determine based on the generated broadcast information a need for a second broadcast resource from a second set of broadcast resources. The broadcast resource determination and selection module 1104 may be configured to select the second broadcast resource based on a priority associated with the first broadcast resource. The broadcast resource determination and selection module 1104 may be configured to inform the broadcast transmission module 1106 of the selected second broadcast resource. The broadcast transmission module 1106 may be configured to transmit a second information subset of the generated broadcast information in the second broadcast resource.

The broadcast transmission module 1106 may be configured to transmit information in the first broadcast resource indicating the selected second broadcast resource. The broadcast receiving module 1102 may be configured to receive a broadcast signal in a third broadcast resource of the first set of broadcast resources. The third broadcast resource may have a higher priority than the first broadcast resource. The broadcast resource determination and selection module 1104 may be configured to determine a fourth broadcast resource in the second set of broadcast resources based on the broadcast signal in the third broadcast resource. The priority of an earlier broadcast resource may higher than the priority of a later broadcast resource. The broadcast resource determination and selection module 1104 may select the second broadcast resource based on the fourth broadcast resource. The second broadcast resource may be the next or next available resource following the fourth broadcast resource.

The broadcast resource determination and selection module 1104 may be configured to determine that a fifth broadcast resource in the second set of broadcast resources is being utilized based on the determined fourth broadcast resource. The fifth broadcast resource may be earlier (e.g., higher priority, earlier in time, earlier in a list or known permutation) than the fourth broadcast resource. The broadcast resource determination and selection module 1104 may be configured to determine to select the fifth broadcast resource as the second broadcast resource when a broadcast signal is not received indicating that the fifth broadcast resource will be utilized. The broadcast resource determination and selection module 1104 may be configured to refrain from selecting the second broadcast resource when the fourth broadcast resource is a last or last available broadcast resource in the second set of broadcast resources.

The apparatus may include additional modules that perform each of the steps of the algorithm in the aforementioned flow charts. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
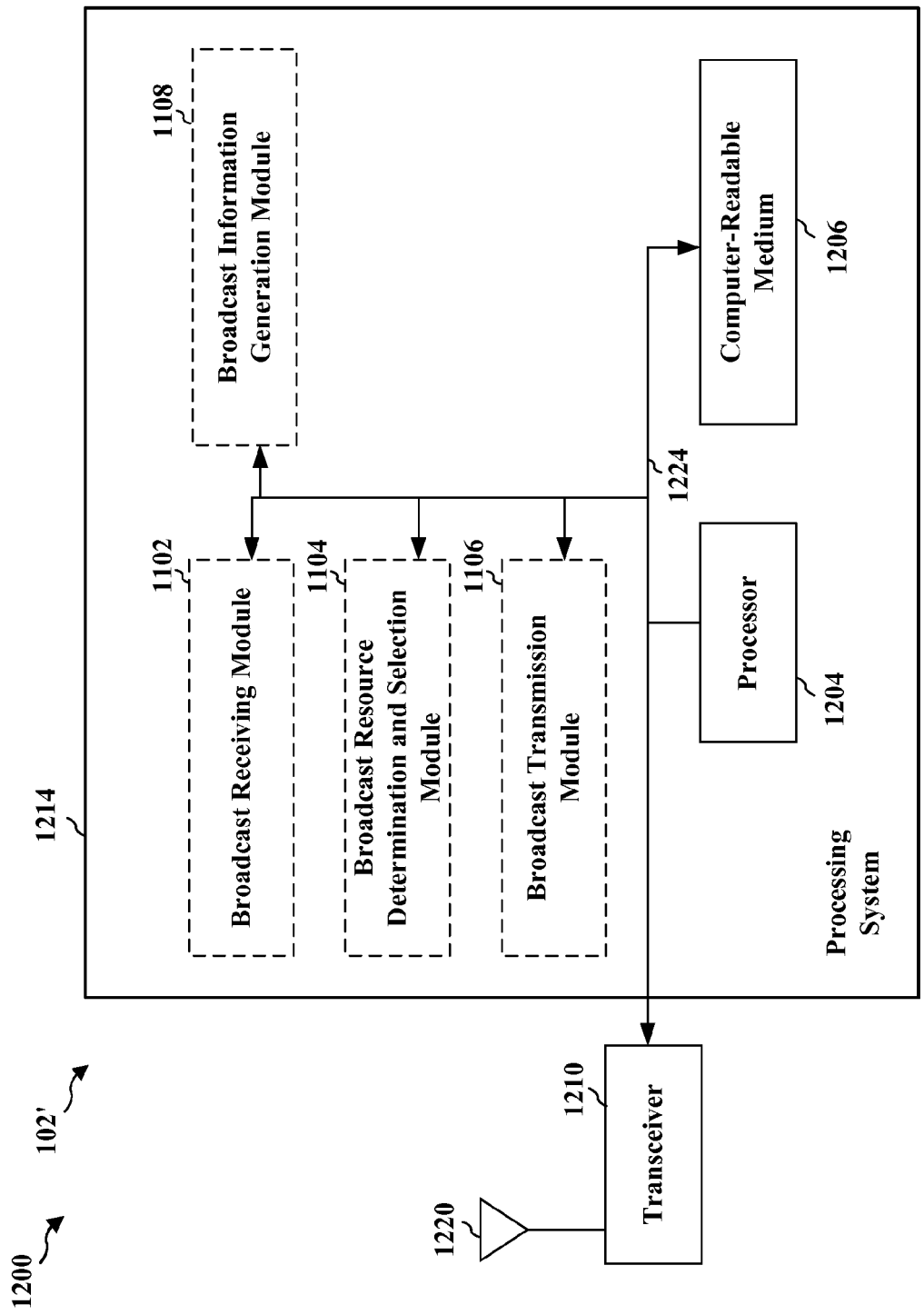
FIG. 12 is a diagram illustrating an example of a hardware implementation for an apparatus employing a processing system.

FIG. 12 is a diagram illustrating an example of a hardware implementation for an apparatus 102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1102, 1104, 1106, 1108, and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1102, 1104, 1106, and 1108. The modules may be software modules running in the processor 1204, resident/stored in the computer readable medium 1206, one or more hardware modules coupled to the processor 1204, or some combination thereof.

In one configuration, the apparatus 102/102' for wireless communication includes means for transmitting broadcast information in a first broadcast resource from a first set of broadcast resources, means for determining based on the broadcast information a need for a second broadcast resource from a second set of broadcast resources, and means for selecting the second broadcast resource based on a priority associated with the first broadcast resource. The apparatus may further include means for transmitting information in the first broadcast resource indicating the selected second broadcast resource. The apparatus may further include means for receiving a broadcast signal in a third broadcast resource of the first set of broadcast resources. The third broadcast resource may have a higher priority than the first broadcast resource. The apparatus may further include means for determining a fourth broadcast resource in the second set of broadcast resources based on the broadcast signal in the third broadcast resource. The apparatus may further include means for determining that a fifth broadcast resource in the second set of broadcast resources is being utilized based on the determined fourth broadcast resource. The fifth broadcast resource may be earlier than the fourth broadcast resource. The apparatus may further include means for determining to select the fifth broadcast resource as the second broadcast resource when a broadcast signal is not received indicating that the fifth broadcast resource will be utilized. The apparatus may further include means for refraining from selecting the second broadcast resource when the fourth broadcast resource is a last available broadcast resource in the second set of broadcast resources. The apparatus may further include means for refraining from selecting the second broadcast resource when the fourth broadcast resource is a last broadcast resource in the second set of broadcast resources. The aforementioned means may be one or more of the aforementioned modules of the apparatus 102 and/or the processing system 1214 of the apparatus 102' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   transmitting broadcast information in a first broadcast resource from a first set of broadcast resources;
   determining based on the broadcast information a need for a second broadcast resource from a second set of broadcast resources; and
   selecting the second broadcast resource based on a priority associated with the first broadcast resource.

2. The method of claim 1, further comprising transmitting information in the first broadcast resource indicating the selected second broadcast resource.

3. The method of claim 1, further comprising:
   receiving a broadcast signal in a third broadcast resource of the first set of broadcast resources, the third broadcast resource having a higher priority than the first broadcast resource; and
   determining a fourth broadcast resource in the second set of broadcast resources based on the broadcast signal in the third broadcast resource.

4. The method of claim 3, wherein the priority of an earlier broadcast resource is higher than the priority of a later broadcast resource.

5. The method of claim 3, wherein the second broadcast resource is selected based on the fourth broadcast resource.

6. The method of claim 5, wherein the second broadcast resource is the next resource following the fourth broadcast resource.

7. The method of claim 5, further comprising:
   determining that a fifth broadcast resource in the second set of broadcast resources is being utilized based on the determined fourth broadcast resource, the fifth broadcast resource being earlier than the fourth broadcast resource; and determining to select the fifth broadcast resource as the second broadcast resource when a broadcast signal is not received indicating that the fifth broadcast resource will be utilized.

8. The method of claim 3, further comprising refraining from selecting the second broadcast resource when the fourth broadcast resource is a last available broadcast resource in the second set of broadcast resources.

9. The method of claim 3, further comprising refraining from selecting the second broadcast resource when the fourth broadcast resource is a last broadcast resource in the second set of broadcast resources.

10. The method of claim 1, wherein the broadcast information comprises a first information subset and a second information subset, the transmitted broadcast information comprises the first information subset, and the determining a need for the second broadcast resource comprises determining a need to transmit the second information subset in broadcasts resources that occur earlier than a next allocated broadcast resource in the first set of broadcast resources.

11. The method of claim 1, wherein the broadcast information comprises a first information subset and a second information subset, the transmitted broadcast information comprises the first information subset, and the determining a need for the second broadcast resource comprises determining a need to transmit the second information subset in additional broadcast resources because the second information subset is too large to be transmitted with the first information subset in the first broadcast resource.

12. The method of claim 1, wherein the second set of broadcast resources is also used for unicast transmissions.

13. An apparatus for wireless communication, comprising:
means for transmitting broadcast information in a first broadcast resource from a first set of broadcast resources;
means for determining based on the broadcast information a need for a second broadcast resource from a second set of broadcast resources; and
means for selecting the second broadcast resource based on a priority associated with the first broadcast resource.

14. The apparatus of claim 13, further comprising means for transmitting information in the first broadcast resource indicating the selected second broadcast resource.

15. The apparatus of claim 13, further comprising:
means for receiving a broadcast signal in a third broadcast resource of the first set of broadcast resources, the third broadcast resource having a higher priority than the first broadcast resource; and
means for determining a fourth broadcast resource in the second set of broadcast resources based on the broadcast signal in the third broadcast resource.

16. The apparatus of claim 15, wherein the priority of an earlier broadcast resource is higher than the priority of a later broadcast resource.

17. The apparatus of claim 15, wherein the second broadcast resource is selected based on the fourth broadcast resource.

18. The apparatus of claim 17, wherein the second broadcast resource is the next resource following the fourth broadcast resource.

19. The apparatus of claim 17, further comprising:
means for determining that a fifth broadcast resource in the second set of broadcast resources is being utilized based on the determined fourth broadcast resource, the fifth broadcast resource being earlier than the fourth broadcast resource; and
means for determining to select the fifth broadcast resource as the second broadcast resource when a broadcast signal is not received indicating that the fifth broadcast resource will be utilized.

20. The apparatus of claim 15, further comprising means for refraining from selecting the second broadcast resource when the fourth broadcast resource is a last available broadcast resource in the second set of broadcast resources.

21. The apparatus of claim 15, further comprising means for refraining from selecting the second broadcast resource when the fourth broadcast resource is a last broadcast resource in the second set of broadcast resources.

22. The apparatus of claim 13, wherein the broadcast information comprises a first information subset and a second information subset, the transmitted broadcast information comprises the first information subset, and the determining a need for the second broadcast resource comprises determining a need to transmit the second information subset in broadcasts resources that occur earlier than a next allocated broadcast resource in the first set of broadcast resources.

23. The apparatus of claim 13, wherein the broadcast information comprises a first information subset and a second information subset, the transmitted broadcast information comprises the first information subset, and the determining a need for the second broadcast resource comprises determining a need to transmit the second information subset in additional broadcast resources because the second information subset is too large to be transmitted with the first information subset in the first broadcast resource.

24. The apparatus of claim 13, wherein the second set of broadcast resources is also used for unicast transmissions.

25. An apparatus for wireless communication, comprising:
a processing system configured to:
transmit broadcast information in a first broadcast resource from a first set of broadcast resources;
determine based on the broadcast information a need for a second broadcast resource from a second set of broadcast resources; and
select the second broadcast resource based on a priority associated with the first broadcast resource.

26. The apparatus of claim 25, wherein the processing system is further configured to transmit information in the first broadcast resource indicating the selected second broadcast resource.

27. The apparatus of claim 25, wherein the processing system is further configured to:
receive a broadcast signal in a third broadcast resource of the first set of broadcast resources, the third broadcast resource having a higher priority than the first broadcast resource; and
determine a fourth broadcast resource in the second set of broadcast resources based on the broadcast signal in the third broadcast resource.

28. The apparatus of claim 27, wherein the priority of an earlier broadcast resource is higher than the priority of a later broadcast resource.

29. The apparatus of claim 27, wherein the second broadcast resource is selected based on the fourth broadcast resource.

30. The apparatus of claim 29, wherein the second broadcast resource is the next resource following the fourth broadcast resource.

31. The apparatus of claim 29, wherein the processing system is further configured to:
determine that a fifth broadcast resource in the second set of broadcast resources is being utilized based on the determined fourth broadcast resource, the fifth broadcast resource being earlier than the fourth broadcast resource; and determine to select the fifth broadcast resource as the second broadcast resource when a broadcast signal is not received indicating that the fifth broadcast resource will be utilized.

32. The apparatus of claim 27, wherein the processing system is further configured to refrain from selecting the second broadcast resource when the fourth broadcast resource is a last available broadcast resource in the second set of broadcast resources.

33. The apparatus of claim 27, wherein the processing system is further configured to refrain from selecting the second broadcast resource when the fourth broadcast resource is a last broadcast resource in the second set of broadcast resources.

34. The apparatus of claim 25, wherein the broadcast information comprises a first information subset and a second information subset, the transmitted broadcast information comprises the first information subset, and the determining a need for the second broadcast resource comprises determining a need to transmit the second information subset in broadcasts resources that occur earlier than a next allocated broadcast resource in the first set of broadcast resources.

35. The apparatus of claim 25, wherein the broadcast information comprises a first information subset and a second information subset, the transmitted broadcast information comprises the first information subset, and the determining a need for the second broadcast resource comprises determining a need to transmit the second information subset in additional broadcast resources because the second information subset is too large to be transmitted with the first information subset in the first broadcast resource.

36. The apparatus of claim 25, wherein the second set of broadcast resources is also used for unicast transmissions.

37. A computer program product, comprising:
a non-transitory computer-readable medium comprising code for:
transmitting broadcast information in a first broadcast resource from a first set of broadcast resources;
determining based on the broadcast information a need for a second broadcast resource from a second set of broadcast resources; and
selecting the second broadcast resource based on a priority associated with the first broadcast resource.

38. The computer program product of claim 37, wherein the non-transitory computer-readable medium further comprises code for transmitting information in the first broadcast resource indicating the selected second broadcast resource.

39. The computer program product of claim 37, wherein the non-transitory computer-readable medium further comprises code for:
receiving a broadcast signal in a third broadcast resource of the first set of broadcast resources, the third broadcast resource having a higher priority than the first broadcast resource; and
determining a fourth broadcast resource in the second set of broadcast resources based on the broadcast signal in the third broadcast resource.

40. The computer program product of claim 39, wherein the priority of an earlier broadcast resource is higher than the priority of a later broadcast resource.

41. The computer program product of claim 39, wherein the second broadcast resource is selected based on the fourth broadcast resource.

42. The computer program product of claim 41, wherein the second broadcast resource is the next resource following the fourth broadcast resource.

43. The computer program product of claim 41, wherein the non-transitory computer-readable medium further comprises code for:
determining that a fifth broadcast resource in the second set of broadcast resources is being utilized based on the determined fourth broadcast resource, the fifth broadcast resource being earlier than the fourth broadcast resource; and
determining to select the fifth broadcast resource as the second broadcast resource when a broadcast signal is not received indicating that the fifth broadcast resource will be utilized.

44. The computer program product of claim 39, wherein the non-transitory computer-readable medium further comprises code for refraining from selecting the second broadcast resource when the fourth broadcast resource is a last available broadcast resource in the second set of broadcast resources.

45. The computer program product of claim 39, wherein the non-transitory computer-readable medium further comprises code for refraining from selecting the second broadcast resource when the fourth broadcast resource is a last broadcast resource in the second set of broadcast resources.

46. The computer program product of claim 37, wherein the broadcast information comprises a first information subset and a second information subset, the transmitted broadcast information comprises the first information subset, and the determining a need for the second broadcast resource comprises determining a need to transmit the second information subset in broadcasts resources that occur earlier than a next allocated broadcast resource in the first set of broadcast resources.

47. The computer program product of claim 37, wherein the broadcast information comprises a first information subset and a second information subset, the transmitted broadcast information comprises the first information subset, and the determining a need for the second broadcast resource comprises determining a need to transmit the second information subset in additional broadcast resources because the second information subset is too large to be transmitted with the first information subset in the first broadcast resource.

48. The computer program product of claim 37, wherein the second set of broadcast resources is also used for unicast transmissions.

* * * * *